US007773985B2

(12) United States Patent  (10) Patent No.: US 7,773,985 B2
Horton et al.  (45) Date of Patent: Aug. 10, 2010

(54) SYMBIOTIC SYSTEM FOR TESTING ELECTROMAGNETIC SIGNAL COVERAGE IN AREAS NEAR TRANSPORT ROUTES

(75) Inventors: Mark Horton, Suwanee, GA (US); Christopher T. Schenken, Alpharetta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 1153 days.

(21) Appl. No.: 10/763,875

(22) Filed: Jan. 23, 2004

(65) Prior Publication Data

US 2005/0064864 A1   Mar. 24, 2005

Related U.S. Application Data

(60) Provisional application No. 60/505,036, filed on Sep. 22, 2003, provisional application No. 60/505,822, filed on Sep. 24, 2003.

(51) Int. Cl.
H04W 24/00 (2009.01)
H04B 17/00 (2006.01)

(52) U.S. Cl. .................... 455/423; 455/115.1; 455/446; 455/67.11; 455/226.1

(58) Field of Classification Search ............... 455/404.2, 455/414.1–414.3, 423–425, 115, 456.1–457, 455/226.1–226.2, 67.11–67.7, 115.1–115.4, 455/446; 340/635; 379/1.01–1.04, 35; 705/6
See application file for complete search history.

(56) References Cited

U.S. PATENT DOCUMENTS 3,822,049 A   7/1974   Saunders

| 4,113,217 A |   | 9/1978 | O'Connell |
| 4,124,815 A |   | 11/1978 | Stoschek |
| 4,977,399 A |   | 12/1990 | Price et al. |
| 5,023,900 A | * | 6/1991 | Tayloe et al. ............. 379/32.01 |

(Continued)

FOREIGN PATENT DOCUMENTS

EP   0 977 450 A2   2/2000

(Continued)

OTHER PUBLICATIONS

"TEMS™ Automatic WCDMA: Take Control of Your Mobile Internet Quality of Service," www.ericsson.com; Publication AE/LZT 123 6694 R1; date of publication unknown (copyright 2001); two pages.

(Continued)

*Primary Examiner*—Lester Kincaid
*Assistant Examiner*—Matthew Sams
(74) *Attorney, Agent, or Firm*—Alston & Bird, LLP

(57) ABSTRACT

A cooperative system for testing signal strength near a target area selected by a wireless provider is disclosed, using test units installed in the fleet vehicles of an unrelated service enterprise. The system in one embodiment includes an algorithm for comparing test parameters to the route data contained in the dispatch plan for the fleet vehicles, in order to identify the optimal routes on which to send test units. A computer software product for storing the parameters and executing the algorithms is also disclosed. Signal testing in a target area is accomplished through the symbiotic relationship between the testing units and the fleet vehicles, whereby the wireless provider benefits from unit carriage along routes already being traveled by the fleet vehicles for a different purpose. This Abstract is provided quickly inform a reader about the subject matter, and not for use interpreting the scope or meaning of the claims.

20 Claims, 7 Drawing Sheets

U.S. PATENT DOCUMENTS

| | | | |
|---|---|---|---|
| 5,095,500 | A | 3/1992 | Tayloe et al. |
| 5,398,276 | A | 3/1995 | Lemke et al. |
| 5,451,839 | A | 9/1995 | Rappaport et al. |
| 5,481,588 | A * | 1/1996 | Rickli et al. ............ 379/32.01 |
| 5,490,204 | A | 2/1996 | Gulledge |
| 5,490,288 | A | 2/1996 | Wiatrowski |
| 5,561,839 | A | 10/1996 | Österberg et al. |
| 5,644,623 | A | 7/1997 | Gulledge |
| 5,694,451 | A | 12/1997 | Arinell |
| 5,706,333 | A | 1/1998 | Grenning et al. |
| 5,710,758 | A | 1/1998 | Soliman et al. |
| 5,752,164 | A * | 5/1998 | Jones ......................... 455/454 |
| 5,758,264 | A * | 5/1998 | Bonta et al. ................. 455/67.7 |
| 5,764,726 | A | 6/1998 | Selig et al. |
| 5,768,689 | A | 6/1998 | Borg |
| 5,805,996 | A * | 9/1998 | Salmela ...................... 455/453 |
| 5,859,894 | A | 1/1999 | Ortiz Perez et al. |
| 5,867,785 | A | 2/1999 | Averbuch et al. |
| 5,913,162 | A | 6/1999 | Gourdin et al. |
| 5,920,607 | A | 7/1999 | Berg |
| 5,926,762 | A | 7/1999 | Arpee et al. |
| 5,930,707 | A | 7/1999 | Vambaris et al. |
| 5,946,612 | A | 8/1999 | Johansson |
| 5,987,306 | A | 11/1999 | Nilsen et al. |
| 5,991,622 | A | 11/1999 | Henry, Jr. |
| 6,052,584 | A | 4/2000 | Harvey et al. |
| 6,157,838 | A | 12/2000 | Di Huo et al. |
| 6,167,272 | A | 12/2000 | Hellstern |
| 6,169,896 | B1 | 1/2001 | Sant et al. |
| 6,201,960 | B1 | 3/2001 | Minde et al. |
| 6,246,880 | B1 | 6/2001 | Iizuka |
| 6,272,337 | B1 | 8/2001 | Mount et al. |
| 6,285,876 | B1 | 9/2001 | Zhong |
| 6,298,233 | B1 | 10/2001 | Souissi et al. |
| 6,308,064 | B1 | 10/2001 | Green |
| 6,315,255 | B1 | 11/2001 | Chan et al. |
| 6,330,428 | B1 | 12/2001 | Lewis et al. |
| 6,332,076 | B1 | 12/2001 | Shah et al. |
| 6,336,035 | B1 * | 1/2002 | Somoza et al. .............. 455/446 |
| 6,356,531 | B1 | 3/2002 | Soliman |
| 6,400,690 | B1 * | 6/2002 | Liu et al. .................... 370/252 |
| 6,411,806 | B1 | 6/2002 | Garner et al. |
| 6,424,837 | B1 | 7/2002 | Hall et al. |
| 6,434,364 | B1 | 8/2002 | O'Riordain |
| 6,449,485 | B1 | 9/2002 | Anzil |
| 6,466,797 | B1 | 10/2002 | Frodigh et al. |
| 6,484,096 | B2 | 11/2002 | Wong et al. |
| 6,507,737 | B1 | 1/2003 | Laham et al. |
| 6,519,452 | B1 | 2/2003 | Agostino et al. |
| 6,556,832 | B1 | 4/2003 | Soliman |
| 6,560,442 | B1 | 5/2003 | Yost et al. |
| 6,567,381 | B1 | 5/2003 | Jeon et al. |
| 6,570,529 | B2 | 5/2003 | Richton et al. |
| 6,603,966 | B1 * | 8/2003 | Sheffield .................... 455/423 |
| 6,711,404 | B1 | 3/2004 | Arpee et al. |
| 6,711,408 | B1 * | 3/2004 | Raith ......................... 455/440 |
| 6,754,487 | B1 * | 6/2004 | Sanders et al. .............. 455/423 |
| 6,757,543 | B2 * | 6/2004 | Moran et al. ............ 455/456.1 |
| 6,842,726 | B1 * | 1/2005 | Scharosch et al. ............. 703/13 |
| 6,853,842 | B1 | 2/2005 | Wilson et al. |
| 6,915,128 | B1 | 7/2005 | Oh |
| 6,928,280 | B1 * | 8/2005 | Xanthos et al. .............. 455/423 |
| 6,931,235 | B2 | 8/2005 | Kline et al. |
| 7,003,264 | B2 * | 2/2006 | Fodor et al. .............. 455/67.11 |
| 7,062,264 | B2 | 6/2006 | Ko et al. |
| 7,099,669 | B2 * | 8/2006 | Sheffield .................... 455/446 |
| 7,113,793 | B2 | 9/2006 | Veerasamy et al. |
| 7,236,779 | B2 | 6/2007 | Lahav et al. |
| 2002/0029108 | A1 | 3/2002 | Liu et al. |
| 2003/0014286 | A1 | 1/2003 | Cappellini |
| 2003/0083115 | A1 | 5/2003 | Kato |
| 2003/0224806 | A1 | 12/2003 | Hebron |

FOREIGN PATENT DOCUMENTS

| | | |
|---|---|---|
| JP | 3251351 | 11/1991 |
| JP | 3062509 | 7/1999 |
| JP | 2000059292 | 2/2000 |
| JP | 2000295168 | 10/2000 |
| JP | 2001024577 | 1/2001 |
| JP | 2001218252 | 8/2001 |
| JP | 2002112302 | 4/2002 |
| JP | 2002335202 | 11/2002 |

OTHER PUBLICATIONS

"TEMS™ Drive Tester CDMA: An Innovative Drive Test Solution," www.ericsson.com/tems; Publication AE/LZT 123 7307, R3; date of publication unknown (copyright 2003); four pages.

Sigler, Lisa; "Assess speech quality with PESQ, now in TEMS™ Automatic;" date of publication unknown; one page.

"TEMS™ Automatic: Streamlined Operations and Improved QoS: GSM/GPRS, CDMA, and TDMA," www.ericsson.com/tems; Publication 287 01-FAP 901 0409 B; date of publication unknown (copyright 2004); four pages.

"TEMS™—Making Wireless Better," by Ericcson; APAC Workshop (Sep. 2004); seventeen pages.

"TechNotes: Tools for Precision: A Tool Kit to Optimize WCDMA Networks," www.ericsson.com/tems; date of publication unknown; one page, numbered p. 46.

Sigler, Lisa, Editor; "TEMS™ News," an Ericsson Newsletter (No. 2, Jun. 2003); eight pages.

Sigler, Lisa, Editor; "TEMS™ News," an Ericsson Newsletter (No. 2, Q2 2004); eight pages.

Sigler, Lisa, Editor; "TEMS™ News," an Ericsson Newsletter (No. 3, Q3 2004); eight pages.

Hedin, Lars-Göran, Editor; "On: The New World of Communication," an Ericsson global customer magazine (Mar. 2002); fifty pages.

"TEMS™ Tech Support: TEMS Automatic GSM: Take Control of Your Mobile Interner Quality of Service," www.ericsson.com/services/tems/suppport/sup_automatic_gsm.shtml; date of publication unknown; three pages.

"TEMS™ Automatic: Making Wireless Better: Take Control of Your Mobile Internet Quality of Service," www.ericsson.com/services/tems/_cdma/automatic-cdma.shtml; date of publications unknown; two pages.

"TEMS™ Tech Support: TEMS DriveTester CDMA: Making Wireless Better: Instantly Isolate Network Trouble Spots," www.ericsson.com/services/tems/support/drivetester/sup_drivetester_cdma:shtml; date of publication unknown; two pages.

"TEMS™ Tech Support: TEMS DriveTester GSM/TDMA: Making Wireless Better: Instantly Isolate Networks Trouble Spots," www.ericsson.com/services/tems/support/drivetester/sup_drivetester_gsnm_tdma.shtml; date of publication unknown; two pages.

"TEMS™ Tech Support: TEMS LinkPlanner: Making Wireless Better: FAQ's," www.ericsson.com/services/tems/support/linkplanner/sup_linkplanner_faq_import.shtml; date of publication unknown; two pages.

"TEMS™ Tech Support: TEMS LinkPlanner: Making Wireless Better: FAQ's: Map Data," www.ericsson.com/services/tems/support/linkplanner/sup_linkplanner_faq_mapdata.shtml; date of publication unknown; one page.

"TEMS™ Tech Support: TEMS LinkPlanner: Making Wireless Better: FAQ's: General," www.ericsson.com/services/tems/support/linkplanner/sup_linkplanner_faq_general.shtml; date of publication unknown; one page.

"TEMS™ Drivetester CDMA2000 2.0: An Innovative Drive Test solution for CDMA Networks," www.ericsson.com/products/TEMSdrivetesterCDMA200020pos.shtml; date of publication unknown; one page.

"TEMS™ Drive Tester CDMA: An Innovative Drive Test Solution," www.ericsson.com/tems; Publication 287 01-FAP 901 0539 Uen; date of publication unknown (copyright 2005); four pages.

International Searching Authority; International Search Report and Written Opinion; mailed Feb. 24, 2005; regarding International Application No. PCT/US2004/030934, "Symbiotic System for Testing Electromagnetic Signal Coverage in Areas Near Transport Routes" (European Patent Office).

International Searching Authority; International Search Report and Written Opinion; mailed Feb. 24, 2005; regarding International Application No. PCT/US2004/030930, "Network Testing Systems and Methods" (European Patent Office).

Office Action dated Nov. 25, 2008, U.S. Appl. No. 10/947,548, filed Sep. 22, 2004.

Office Action dated Jul. 9, 2008, U.S. Appl. No. 10/947,548, filed Sep. 22, 2004.

Office Action dated Jan. 24, 2009, U.S. Appl. No. 10/947,548, filed Sep. 22, 2004.

* cited by examiner

SYMBIOTIC SYSTEM FOR TESTING ELECTROMAGNETIC SIGNAL COVERAGE IN AREAS NEAR TRANSPORT ROUTES

CROSS-REFERENCE TO RELATED APPLICATIONS

This application claims the benefit and priority of the following patent applications, each of which is incorporated herein by reference in its entirety: the U.S. Provisional Application bearing Ser. No. 60/505,036, filed Sep. 22, 2003; and the U.S. Provisional Application bearing Ser. No. 60/505,822, filed Sep. 24, 2003.

BACKGROUND

1. Technical Field

The following disclosure relates generally to the field of regional testing of signal coverage in a wireless telecommunications system and more particularly, to the task of optimally allocating a plurality of portable signal test units among a fleet of service vehicles embarking on routes assigned according to the needs of a service enterprise.

2. Description of Related Art

Many wireless telecommunications providers monitor signal coverage in a particular region by sending a vehicle with a signal testing unit to the region in response to customer complaints. Testing signal coverage on an ad hoc basis represents an inefficient use of labor, equipment, and resources. Monitoring signal coverage only after a problem is reported does not boost customer confidence and it relies on customers to report coverage gaps promptly and accurately.

The planning of efficient and effective systems for monitoring signal coverage presents a variety of technical and logistical challenges. Many wireless providers maintain small fleets of equipped vehicles to be deployed to a particular area when testing is needed, such as when a new cell tower is erected or a sector configuration is updated. Testing may also be required during certain peak times, such as the morning or evening rush hours.

Supporting and maintaining a captive fleet of vehicles in each region or major metropolitan area requires trained personnel and logistics support, in addition to the cost of the signal testing units. As the demand for and use of wireless communication devices continues to increase, the task of monitoring signal coverage in every major market nationwide represents a significant logistical and economic burden for most wireless providers. Thus, there exists a need in the art for an efficient and cost-effective system of testing electromagnetic signal coverage in a geographical area when the need arises to gather signal data. There is a further need for an efficient and scalable system, capable of testing a specific target area or an entire regional network, either on a one-time basis or on a regular and continuing basis.

Certain illustrative and exemplary systems, methods, and apparatuses are described herein in connection with the following description and the accompanying drawing figures. The examples discussed represent only a few of the various ways of applying the principles supporting the material disclosed and, thus, the examples are intended to include equivalents. Other advantages and novel features may become apparent from the detailed description which follows, when considered in conjunction with the drawing figures.

SUMMARY OF THE INVENTION

The following summary is not an extensive overview and is not intended to identify key or critical elements of the apparatuses, methods, systems, processes, and the like, nor is it intended to delineate the scope of such elements. This Summary provides a conceptual introduction in a simplified form as a prelude to the more-detailed description that follows.

Certain illustrative example apparatuses, methods, systems, processes, and the like, are described herein in connection with the following description and the accompanying drawing figures. These examples represent but a few of the various ways in which the principles supporting the apparatuses, methods, systems, processes, and the like, may be employed and thus are intended to include equivalents. Other advantages and novel features may become apparent from the detailed description which follows, when considered in conjunction with the drawing figures.

The example methods, products, and systems described herein facilitate the testing of electromagnetic signal strength in or near a target area.

In one aspect of the present invention, a method of testing electromagnetic signal strength near a target area may include: establishing test parameters, employing a service enterprise having a fleet of vehicles serving a territory near the target area, each of the vehicles assigned to one of a plurality of routes according to a dispatch plan, the dispatch plan comprising vehicle data and route data, comparing the test parameters to the dispatch plan for each of the plurality of routes, identifying one or more optimal routes from among the plurality of routes based on the results of the comparing, the optimal routes comprising those most nearly satisfying the test parameters, installing one of a plurality of electromagnetic signal testing units in the vehicle assigned to each of the one or more optimal routes, and receiving data gathered by each of the plurality of signal testing units.

In another aspect of the method, the step of establishing test parameters may include storing a geographic parameter, and the route data may include a start location, an end location, and one or more intermediate stop locations.

In another aspect of the method, the step of storing a geographic parameter may include storing one or more tower identifiers, each defining a tower location, and storing one or more sector identifiers, each of the one or more sector identifiers comprising a sector location and an antenna configuration.

In another aspect of the method, the step of establishing test parameters may include storing a time parameter describing a time window, and the route data may include a start time corresponding to the start location, an end time corresponding to the end location, and one or more intermediate stop durations corresponding to the one or more intermediate stop locations.

In another aspect of the method, the step of storing a time parameter may include storing one or more lingering parameters, each of the one or more lingering parameters comprising a linger duration, a tower identifier, and a sector identifier.

In another aspect of the method, the step of establishing test parameters may include storing one or more unit parameters, each of the one or more unit parameters comprising a unit type and a unit feature, and storing a quantity parameter defining an available number of the units, wherein the vehicle data includes a number of vehicles in the fleet.

In another aspect of the method, the step of installing may include providing a universal bracket in each vehicle in the fleet, the bracket configured to releasably receive any of a variety of types of the testing units.

In another aspect of the method, the step of establishing test parameters may include assigning a weight to one or more of the test parameters, each of the weights correlated to the importance of the one or more of the test parameters relative to the others.

In another aspect of the method, the step of comparing the test parameters to the dispatch plan may be executed by a computer software program product.

In another aspect of the method, the step of establishing the test parameters may be accomplished by a wireless provider, the wireless provider generally unrelated to the service enterprise.

In another aspect of the present invention, a computer software program product is provided for testing electromagnetic signal strength near a target area. The product may include: a first executable portion configured to store test parameters, a second executable portion configured to store a dispatch plan for a fleet of vehicles serving a territory near the target area, each of the vehicles assigned to one of a plurality of routes according to a dispatch plan, the dispatch plan comprising vehicle data and route data, a third executable portion configured to compare the test parameters to the dispatch plan for each of the plurality of routes, a fourth executable portion configured to identify one or more optimal routes from among the plurality of routes based on the results of the third executable portion, the optimal routes comprising those most nearly satisfying the test parameters, a fifth executable portion configured to identify the vehicle assigned to each of the one or more optimal routes, the vehicle to receive one of a plurality of electromagnetic signal testing units, a sixth executable portion configured to receive data gathered by each of the plurality of signal testing units.

In another aspect of the product, the first executable portion may store test parameters including a geographic parameter, and the second executable portion may store route data including a start location, an end location, and one or more intermediate stop locations.

In another aspect of the product, the first executable portion may store test parameters including a geographic parameter comprising one or more tower identifiers, each defining a tower location, and one or more sector identifiers, each of the one or more sector identifiers comprising a sector location and an antenna configuration.

In another aspect of the product, the first executable portion may store test parameters including a time parameter describing a time window, and the second executable portion may store route data including a start time corresponding to the start location, an end time corresponding to the end location, and one or more intermediate stop durations corresponding to the one or more intermediate stop locations.

In another aspect of the product, the first executable portion may store test parameters including a time parameter comprising one or more lingering parameters, each of the one or more lingering parameters comprising a linger duration, a tower identifier, and a sector identifier.

In another aspect of the product, the first executable portion may store test parameters including one or more unit parameters, each of the one or more unit parameters comprising a unit type and a unit feature, and a quantity parameter defining an available number of the units, and the second executable portion may store vehicle data including a number of vehicles in the fleet.

In another aspect of the product, the first executable portion may store a weight assigned to one or more of the test parameters, each of the weights correlated to the importance of the one or more of the test parameters relative to the others.

In another aspect of the present invention, a system is provided for testing electromagnetic signal strength near a target area. The system may include: a plurality of electromagnetic signal testing units, a wireless provider establishing test parameters, a service enterprise having a fleet of vehicles serving a territory near the target area, each of the vehicles in the fleet assigned to one of a plurality of routes according to a dispatch plan, the dispatch plan comprising vehicle data and plan data, means for comparing the test parameters to the dispatch plan for each of the plurality of routes, means for identifying one or more optimal routes from among the plurality of routes based on the comparing means, the optimal routes comprising those most nearly satisfying the test parameters, one of the plurality of testing units installed in the vehicle assigned to each of the one or more optimal routes, and a receiver for receiving data gathered by each of the plurality of signal testing units.

In another aspect of the system, the test parameters may include a geographic parameter, and the route data may include a start location, an end location, and one or more intermediate stop locations.

In another aspect of the system, the geographic parameter may include one or more tower identifiers, each defining a tower location, and one or more sector identifiers, each of the one or more sector identifiers comprising a sector location and an antenna configuration.

In another aspect of the system, the test parameters may include a time parameter describing a time window, and the route data may include a start time corresponding to the start location, an end time corresponding to the end location, and one or more intermediate stop durations corresponding to the one or more intermediate stop locations.

In another aspect of the system, the time parameter may include one or more lingering parameters, each of the one or more lingering parameters comprising a linger duration, a tower identifier, and a sector identifier.

In another aspect of the system, the test parameters may include one or more unit parameters, each of the one or more unit parameters comprising a unit type and a unit feature, and a quantity parameter defining an available number of the units, and the vehicle data may include a number of vehicles in the fleet.

In another aspect of the system, the system may further include a universal bracket in each vehicle in the fleet, the bracket configured to releasably receive any of a variety of types of the testing units.

In another aspect of the system, the test parameters may include a weight assigned to one or more of the test parameters, each of the weights correlated to the importance of the one or more of the test parameters relative to the others.

In another aspect of the system, the comparing means may include a computer software program product. In another aspect of the system, the identifying means may include a computer software program product.

In another aspect of the system, the wireless provider may be generally unrelated to the service enterprise.

These and other objects are accomplished by the methods, products, and systems described herein and will become apparent from the following description of a preferred embodiment in conjunction with the accompanying drawings in which like numerals designate like elements.

BRIEF DESCRIPTION OF THE DRAWING

The invention may be more readily understood by reference to the following description, taken with the accompanying drawing figures, in which.

DETAILED DESCRIPTION

Figure 1:
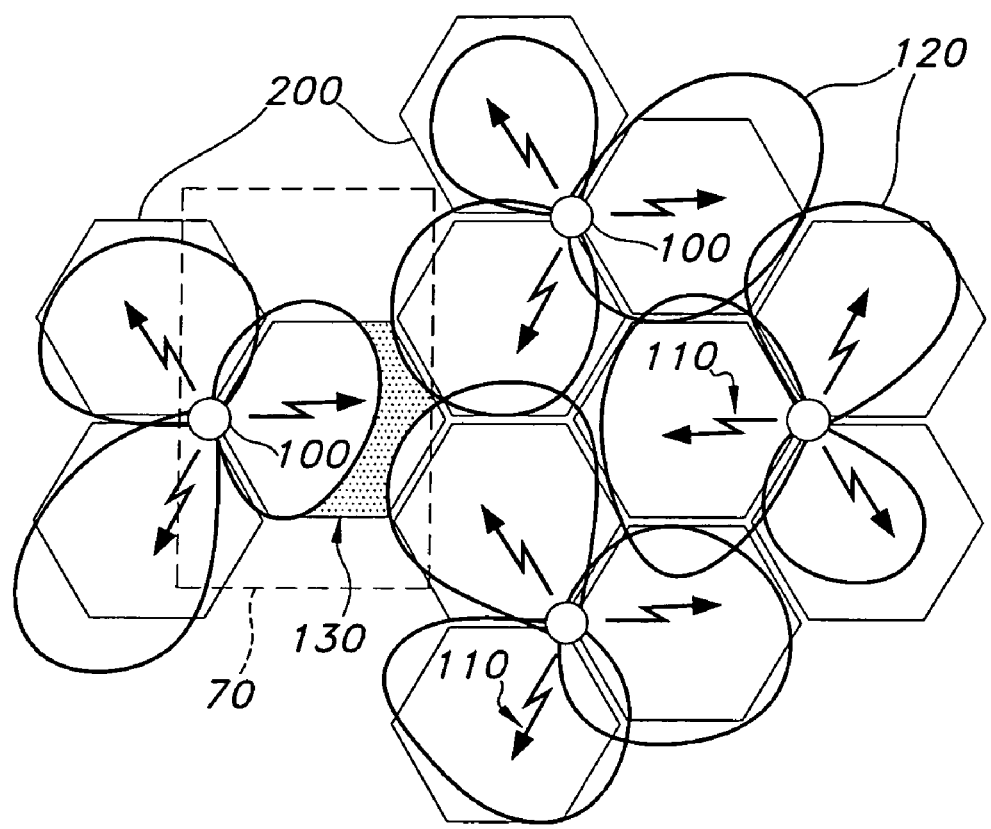
FIG. 1 is an illustration of a wireless telecommunications system, depicting several cell towers and a group of hexagonal cells, according to one embodiment of the present invention.

This application claims the benefit and priority of the following patent applications, each of which is incorporated herein by reference in its entirety: the U.S. Provisional Application bearing Ser. No. 60/505,036, filed Sep. 22, 2003; and the U.S. Provisional Application bearing Ser. No. 60,505,822, filed Sep. 24, 2003.

1. Introduction

Exemplary systems, methods, and apparatuses are now described with reference to the drawing figures, where like reference numerals are used to refer to like elements throughout the several views. In the following description, for purposes of explanation, numerous specific details are set forth in order to facilitate a thorough understanding of the systems, methods, apparatuses, and the like. It may be evident, however, that the exemplars described may be practiced without these specific details. In other instances, common structures and devices are shown in block diagram form in order to simplify the description.

As used in this application, the term "computer component" refers to a computer-related entity, either hardware, firmware, software, a combination thereof, or to software in execution: For example, a computer component can be, but is not limited to being, a server, a processor, a process running on a processor, an object, an executable, a thread of execution, a program, and a computer. By way of illustration, both an application running on a server and the server itself can be a computer component. One or more computer components cans reside within a process and/or thread of execution and a computer component can be localized on a single computer and/or distributed between and among two or more computers.

"Software," as used herein, includes but is not limited to, one or more computer readable and/or executable instructions that cause a computer, computer component and/or other electronic device to perform functions, actions and/or behave in a desired manner. The instructions may be embodied in various forms like routines, algorithms, modules, methods, threads, and/or programs. Software may also be implemented in a variety of executable and/or loadable forms including, but not limited to, a stand-alone program, a function call (local and/or remote), a servelet, an applet, instructions stored in a memory, part of an operating system or browser, and the like. It is to be appreciated that the computer readable and/or executable instructions can be located in one computer component and/or distributed between two or more communicating, co-operating, and/or parallel-processing computer components and thus can be loaded and/or executed in serial, parallel, massively parallel and other manners. It will be appreciated by one of ordinary skill in the art that the form of software may be dependent on, for example, requirements of a desired application, the environment in which it runs, and/or the desires of a designer or programmer or the like.

"Data store," as used herein, refers to a physical and/or logical entity that can store data. A data store may be, for example, a database, a table, a file, a list, a queue, a heap, and so on. A data store may reside in one logical and/or physical entity and/or may be distributed between two or more logical and/or physical entities.

The systems, methods, apparatuses, and objects described herein may be stored, for example, on a computer readable media. Media may include, but are not limited to, an ASIC, a CD, a DVD, a RAM, a ROM, a PROM, a disk, a carrier wave, a memory stick, and the like. Thus, an example computer readable medium can store computer executable instructions for a method for managing transportation assets. The method includes planning a route for a transportation asset based on the analysis of data retrieved from an experience-based route database.

To the extent that the term "includes" is employed in the detailed description or the list of exemplary inventive concepts, it is intended to be inclusive in a manner similar to the term "comprising" as that term is interpreted when employed as a transitional word in a claim. Further still, to the extent that the term "or" is employed in the list of exemplary inventive concepts (for example, A or B) it is intended to mean "A or B or both." When the author intends to indicate "only A or B but not both," the author will employ the phrase "A or B but not both." Thus, use of the term "or" herein is the inclusive use, not the exclusive use. See Bryan A. Gamer, A Dictionary Of Modern Legal Usage 624 (2d ed. 1995).

It will be appreciated that some or all of the processes and methods of the system involve electronic and/or software applications that may be dynamic and flexible processes so that they may be performed in other sequences different than those described herein. It will also be appreciated by one of ordinary skill in the art that elements embodied as software may be implemented using various programming approaches such as machine language, procedural, object oriented, and/or artificial intelligence techniques.

The processing, analyses, and/or other functions described herein may also be implemented by functionally equivalent circuits like a digital signal processor circuit, a software controlled microprocessor, or an application specific integrated circuit. Components implemented as software are not limited to any particular programming language. Rather, the description herein provides the information one skilled in the art may use to fabricate circuits or to generate computer software to perform the processing of the system. It will be appreciated that some or all of the functions and/or behaviors of the present system and method may be implemented as logic as defined above.

Many modifications and other embodiments may come to mind to one skilled in the art who has the benefit of the teachings presented in the description and drawings. It should be understood, therefore, that the invention is not be limited to the specific embodiments disclosed and that modifications and alternative embodiments are intended to be included within the scope of the disclosure and the exemplary inventive concepts. Although specific terms may be used herein, they are used in a generic and descriptive sense only and not for purposes of limitation.

2. A Wireless Provider

In general, a wireless telecommunications system may include a network of radio base stations or cell towers 100 supporting an array of antennas, each broadcasting a downlink signal 110 to various mobile devices, such as wireless telephones. As shown in FIG. 1, the downlink signal 110 may be directed toward a particular area or sector 120. The space around a tower 100 may be divided into any number of sectors 120. A signal 110 may have an adjustable beamwidth, signal strength, pointing angle, and other variables that produce a desired amount of sector coverage from that signal 110.

The geographic area served by the cell towers 100 may be divided into hexagonal cells 200 such as the ones shown in FIG. 1. In theory, the signals 110 may be expected to serve an entire cell 200. In practice, however, due to interference from various sources including terrain and manmade structures, the signals 100 generally serve or cover a finite sector 120. A sector 120 may take various shapes, as shown.

Often, sectors 120 overlap somewhat and thereby provide continuous coverage between and among contiguous cells 100. In some cases, however, the sectors 120 do not provide complete coverage, leaving a gap 130 such as the one shown in FIG. 1. A gap 130 may cause a serious and noticeable lapse in coverage for an area, especially if there is a major road or other collection of active users within the gap 130. One such major road is illustrated in FIG. 2, in which a road map is superimposed upon the network of cell towers 100 from FIG. 1.

Figure 2:
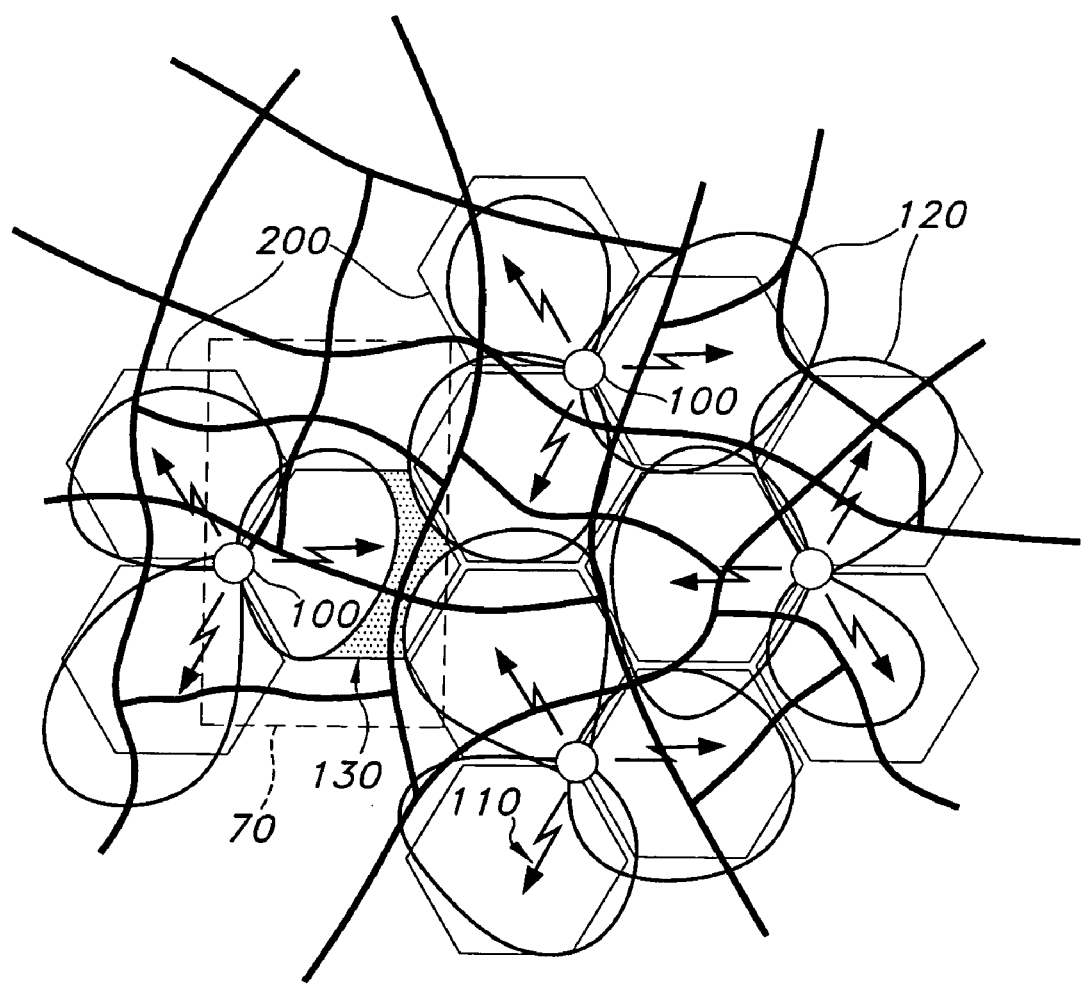
FIG. 2 is an illustration of the wireless telecommunications system illustrated in FIG. 1, superimposed upon an illustration of a map of roads in a service territory, according to one embodiment of the present invention.

The road passing through the gap 130 in FIG. 2 represents an area where many customers may experience an unexpected discontinuity in coverage. A wireless provider may become aware of the gap 130 from customer complaints, estimates or approximations of signal strength and sector shape, random testing, or by the system of the present invention in one embodiment. The gap 130 may prompt the wireless provider to identify one or more cell towers 100 or hexagonal cells 200 of interest that require further investigation or testing. The wireless provider may also select or define a target area 70 (as shown) near the gap 130, which may or may not include one or more cell towers 100 and other network features.

In practice, the target area 70 may or may not include a gap 130 in signal coverage. A wireless provider may select a target area 70 for testing for any reason or no reason. For example, a target area 70 may be selected on the basis of new equipment installed nearby or because of customer reports unrelated to a gap 130 or related to a gap 130 not yet identified. Also, a wireless provider may select a target area 70 on a random basis, as part of a system-wide testing and monitoring program, for example. Once the need to test is identified, the wireless provider is faced with the task of testing the signals and related equipment within or near the target area 70.

3. A Service Enterprise

In one embodiment, a system 10 according to the present invention may include a service enterprise that may be generally unrelated to the wireless provider. The system 10 may include several service enterprises or several related divisions or subsidiaries of a single service enterprise. The service enterprise may serve a similar or nearby territory relative to the area served by the wireless provider.

Figure 3:
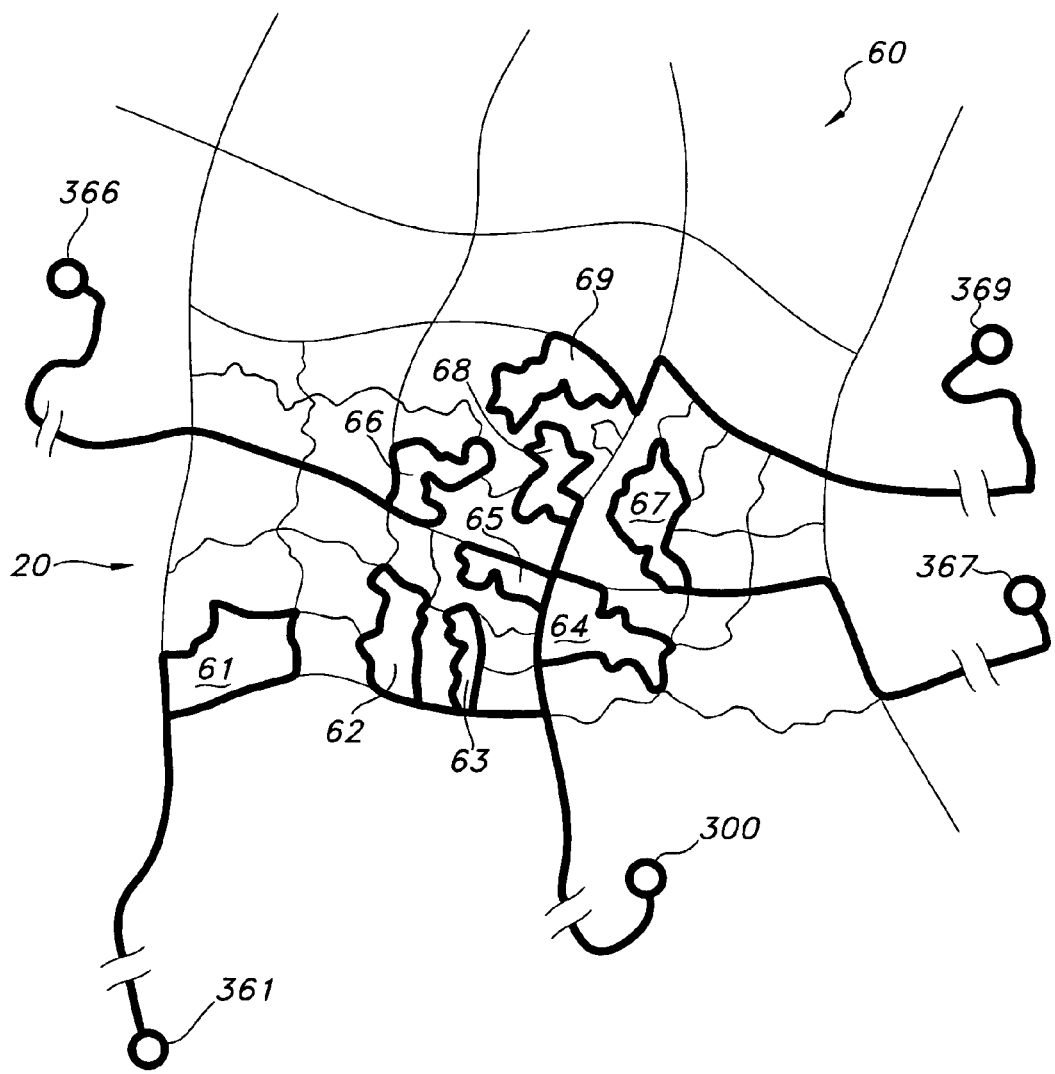
FIG. 3 is an illustration of a dispatch plan, including several routes, superimposed upon the road map illustrated in FIG. 2, according to one embodiment of the present invention.

In one embodiment, the service enterprise may operate a fleet of service vehicles within a service territory 20, as shown in FIG. 3. The service territory 20 may include a single hub or several hubs 300, 361, 366, 367, 369. The vehicles in the fleet may be dispatched along various routes 61-69 by the service enterprise according to a dispatch plan 60 such as the one shown in FIG. 3. For example, a vehicle may be dispatched from hub 361 along a first route 61. Other fleet vehicles may be dispatched from hub 300 along a second route 62, a third route 63, and so forth.

A dispatch plan 60 may include the same or similar routes every day, or the plan 60 may vary on a daily or other basis. For a service enterprise such as the U.S. Postal Service, for example, the daily routes are generally fixed. For many other types of service enterprises, however, customer participation and daily demand are generally stochastic (random). A subset of customers with a repeating or daily need may sometimes be identified. Generally, however, the list of participating customer addresses will vary significantly on any given day. The types of services provided along the set of routes may also vary significantly. For example, the service may include pickups as well as deliveries. Additionally, the service types may include specific pickup times or guaranteed delivery times.

A dispatch plan 60 may include vehicle data and route data, in one embodiment. The vehicle data may include the number of vehicles to be dispatched, the type or size of each vehicle, a specific route number or identifier to which each vehicle is assigned, and other data linking the vehicle to one or more routes in the plan. The route data may include geographic characteristics, such as a start location, an end location, and one or more intermediate stop locations. Route data may also include time data, such as a start time corresponding to the start location, an end time corresponding to the end location, and one or more intermediate stop durations corresponding to each intermediate stop location.

The system constraints on a service enterprise may include the number and capacity of the vehicles in its fleet, the number of drivers, and the number of hours in a work day. The geography of the service territory 20 also creates a unique set of constraints and challenges. In one embodiment of the present invention, a service enterprise may be any type of company or enterprise generally serving a territory or region along definable routes, such as a delivery company, a service and repair company, a private or public transit system, a railroad, an airline, and the like.

Figure 4:
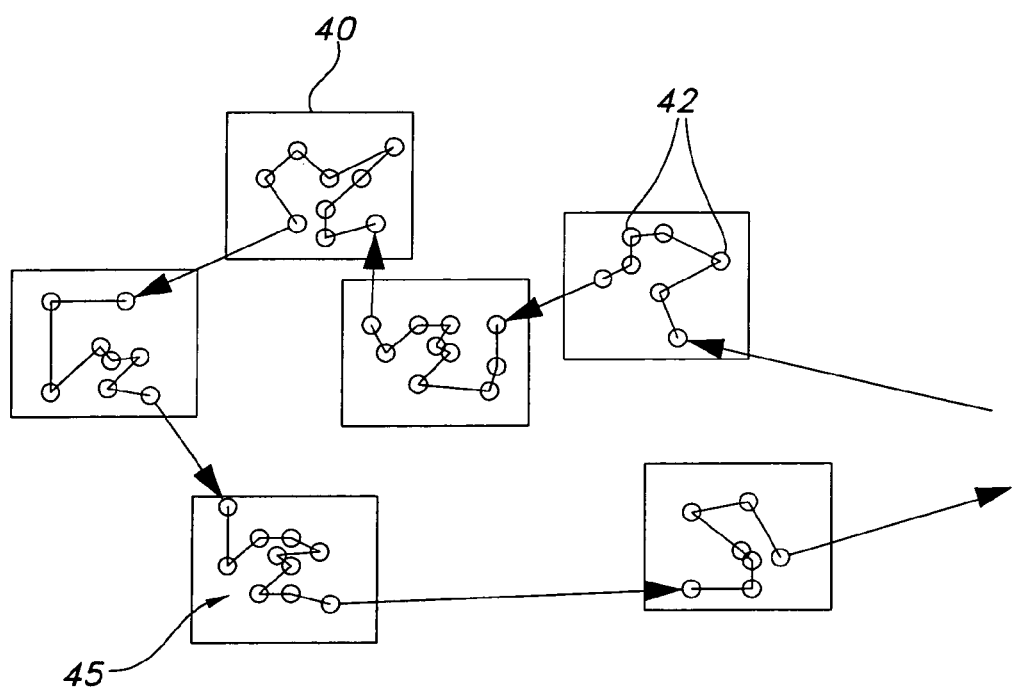
FIG. 4 is a graphical illustration of a cluster of stops along a route, according to one embodiment of the present invention.

One approach to serving a territory 20, for example, may include dispatching vehicles from a central hub to a specific outlying area or cluster 40, as illustrated generally in FIG. 4. Within a cluster 40, a travel route may include a sub-route 45 between and among one or more stops 42. In this aspect, the routes 61-69 shown in FIG. 3 may include one or more clusters 40 where multiple stops 42 are required. Each stop 42 may or may not include one or more service activities, such as a parcel delivery or pickup for example.

The roads shown in FIG. 3 are based upon the major roads as drawn in FIG. 2. As shown, the routes 61-69 in FIG. 3 traverse portions of the same major roads shown in FIG. 2. If FIG. 3 is superimposed upon an enlarged section of FIG. 2, the result is illustrated in FIG. 6.

Figure 6:
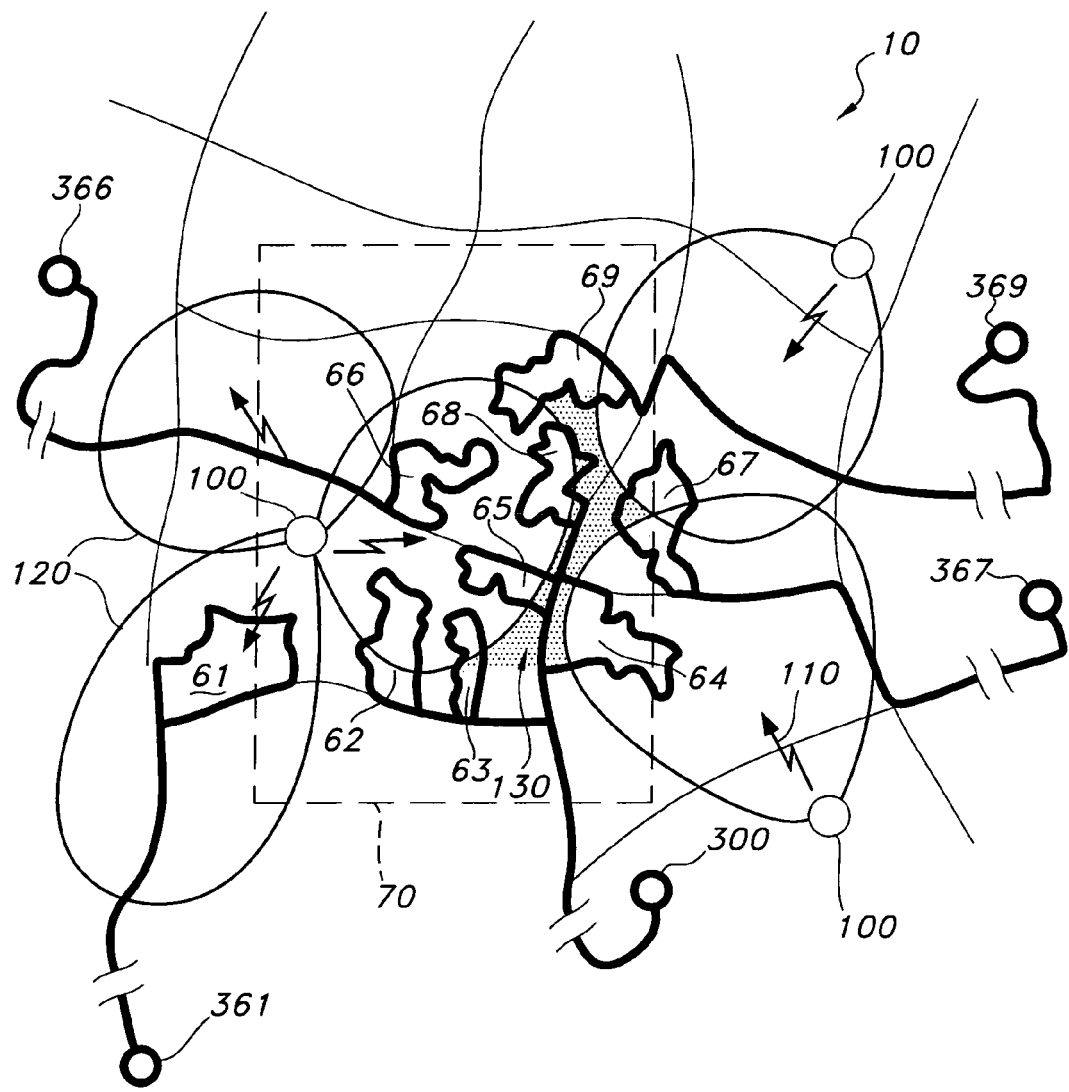
FIG. 6 is a composite illustration of the wireless system depicted in FIG. 2 and the routes illustrated in FIG. 3, together illustrating a system according to one embodiment of the present invention.

FIG. 6 is a composite illustration of the wireless system and target area 70 depicted in FIG. 2 and the routes 61-69 illustrated in FIG. 3. The nearby cell towers 100 and their respective sectors 120 of coverage are also shown in FIG. 6.

4. Commensal Symbiosis

In biological terms, symbiosis describes a situation in which two dissimilar organisms live together. The types of symbiosis include parasitism (in which one organism benefits at the other's expense), commensalism (in which one organism benefits greatly and the other is not much affected), and mutualism (in which both organisms benefit from the relationship).

Commensalism is perhaps best demonstrated by the relationship between the remora and the shark. Remora are small fish that live on and around sharks. A remora has a sucker-like disk on its dorsal side which allows it to temporarily attach to a shark. Both creatures benefit from the symbiosis, but the remora benefits much more than the shark. The remora receives a steady source of food by feeding on scraps left by the shark. The shark benefits because the remora also eats tiny, shrimp-like parasites that live on the shark's skin.

In the context of an embodiment of the present invention, commensal symbiosis describes a mutually-beneficial and cooperative relationship between a wireless provider and a service enterprise in one embodiment of a a system 10 according to the present invention. More particularly, a commensal symbiotic relationship may exist in a system 10 such as the one illustrated in FIG. 7, between a signal testing unit 80 and a selected service vehicle 96. Like a remora attached to a shark, a testing unit 80 may benefit the wireless provider by being carried along by the selected service vehicle 96 of the service enterprise. In this aspect, the wireless provider may be described as employing the service enterprise to carry the testing unit 80. Signal testing in a target area is accomplished through the symbiotic relationship between the testing units 80 and the selected vehicles 96, whereby the wireless provider benefits from having the units carried along routes already being traveled by the vehicles for a generally different purpose, such as deliveries.

The testing unit 80 may be portable and may be carried along a route within or near a target area 70 (as shown in FIG. 6) where signal testing is desired. In exchange, the service enterprise operating the selected service vehicle 96 may receive a fee or other consideration from the wireless provider.

In one embodiment, the routes traveled by the vehicles are near the target area 70 where signal testing is desired. As used in this application, the term "near" includes a route either wholly or partially within the boundaries of a target area, as well as a route or portion of a route passing within relatively a short distance from a target area. The desired proximity of a route to a target area may be defined by the system according to the needs of the testing to be conducted. For example, one test may request routes lying entirely within the target area, whereas another test may request routes passing within a hundred miles of the target area. The test parameters, discussed below, may include a geographic parameter in one embodiment, which may include the desired proximity of the routes to be selected near the target area. Accordingly, the term "near" as used herein represents a variable to be determined by participants in the system of the present invention.

5. A Method of Allocating Test Units Among Selected Vehicles

Figure 5:
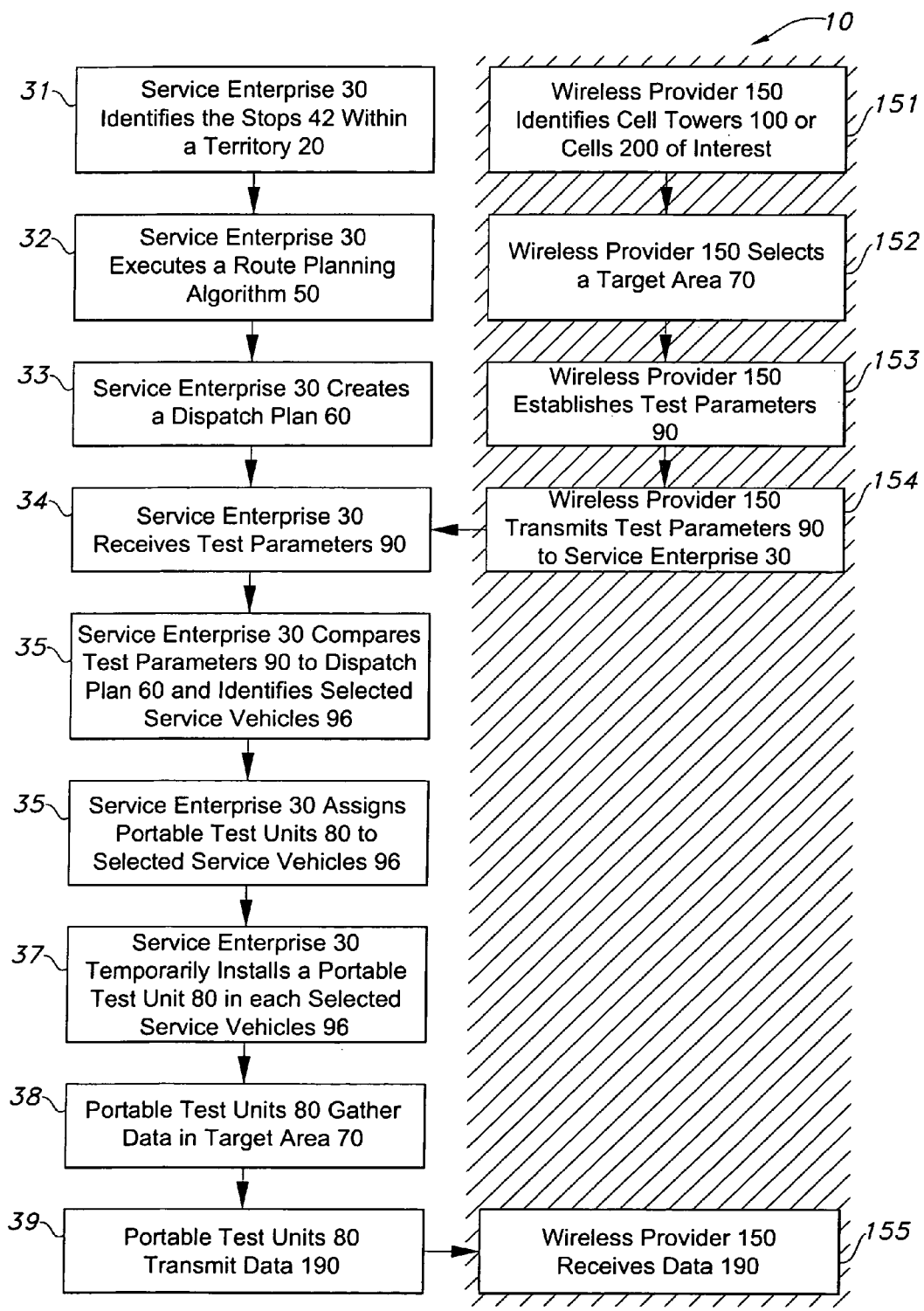
FIG. 5 is a flow diagram illustrating a series of steps executed by a wireless provider and a service enterprise, according to one embodiment of the present invention.

In one embodiment, the system 10 of the present invention includes a method of assigning each signal testing unit 80 to be temporarily installed in a selected vehicle according to the logistical intersection between a set of test parameters 90 and a dispatch plan 60. In one embodiment, as shown in FIG. 5, a wireless provider 150 may develop a set of test parameters 90, while the service enterprise 30 develops a dispatch plan 60. The characteristics of the intersection between the test parameters 90 and the dispatch plan 60 depend upon a large number of variables, many of which are specific to the particular target area 70 selected for testing.

FIG. 5 is a flow diagram illustrating a series of steps executed by a service enterprise 30 and a wireless provider 150, according to one embodiment of the system 10 of the present invention. In general, the first several steps taken by each entity 30, 150 may occur independently of the other. The service enterprise 30 may create a dispatch plan 60 regardless of the actions taken by the wireless provider 150. Similarly, the wireless provider 150 may establish test parameters 90 regardless of the actions taken by the service enterprise 30. In one embodiment, the wireless provider 150 and/or the service enterprise 30 may delegate the tasks described in the steps herein to a different company or entity.

As shown, the service enterprise 30 may begin in Step 31 by identifying the stops 42 within a service territory 20. The service enterprise 30 may execute one or more formal or informal route planning algorithms 50 in Step 32. In one embodiment, the system 10 of the present invention may include a route planning algorithm 50 such as the one described in the U.S. Non-provisional application Ser. No. 10/647,062, entitled "Core Area Territory Planning for Optimizing Driver Familiarity and Route Flexibility," which was filed Aug. 22, 2003, and is incorporated herein by reference in its entirety. In Step 33, the service enterprise 30 may create a dispatch plan 60 designed to serve the stops 42 by providing one or more service activities. In other words, a dispatch plan 60 may include routes where no service activity is provided; that is, one or more routes in a dispatch plan 60 may be designed specifically to satisfy one or more test parameters 90 as described herein.

The wireless telecommunications provider 150 may begin in Step 151 by identifying one or more cell towers 100 or hexagonal cells 200 of interest. Based upon the region and the need, the wireless provider 150 may select a target area 70 in Step 152. In Step 153, the wireless provider 150 may establish a set of test parameters 90 to govern aspects of the testing to be accomplished.

5.1. Test Parameters

In one embodiment, the system 10 of the present invention may accommodate a multitude of test parameters 90 or rules. The test parameters 90 may include few variables for a simple plan, or they may include a multitude of variables for a more complex plan. A simple plan, for example, may include testing one region at a time, testing regions in a random pattern, or testing a region served by new equipment. A more complex plan, for example, may include testing specific regions in response to customer complaints or technical difficulties, or testing specific regions based on a technical analysis of signal data.

The test parameters 90 may be set or established by a wireless provider, a service enterprise, both jointly, or by another entity. The establishment of the test parameters 90 generally defines the desired characteristics and limits of the testing to be performed.

The test parameters 90 may include a geographic parameter describing the geographic traits or boundaries of the target area 70. The geographic parameter may describe the area 70 numerically or graphically or both. The geographic parameter may relate to political divisions such as zip codes and city limits, natural features such as rivers, manmade features such as roads, latitudes and longitudes, locations defined by Global Positioning Satellite (GPS) data, or any other reference that provides a reliable and defined location.

The test parameters 90 may also include a tower parameter describing the location of each cell tower 100 of interest. The tower parameter may include the latitude and longitude, the graphical location on a map, the GPS coordinates, or any other indicator of the particular tower or towers 100 involved in the test.

The test parameters 90 may also include one or more sector identifiers for each tower 100, including data such as: (a) the geographic limits or border of the sector 120 as designed or as previously measured, in two dimensions or three; (b) the beamwidth, azimuth, pointing angle, or other data describing the configuration of the antenna for the sector 120; and (c) any other sector characteristics that may be particularly useful during testing.

The test parameters 90 may also include a unit parameter identifying the type of signal testing unit 80 best suited or selected for use in the test. A unit parameter may include a unit type indicator, one or more unit features, and other relevant characteristics of each testing unit 80 available for use. The testing unit 80 may be defined by such factors as manufacturer, model number, serial number; whether it senses cellular, analog, or digital transmissions; and other factors or features that may be desired for testing in a particular target area 70.

The test parameters 90 may also include a quantity parameter identifying the total number of signal testing units 80 requested for use in the test. The quantity parameter may reflect the number of units 80 required to produce a statistically-reliable set of data 190, in accordance with the type of analysis to be performed on the data. In one embodiment, the quantity parameter may be used to determine a daily visit frequency; in other words, the number of testing units 80 requested to be within or near a target area 70 during a particular day.

The test parameters 90 may also include a time parameter, such as a preferred time window, which may include a specific start and stop time such as for a specific peak period. In one embodiment, the time parameter may be used to establish a test duration, which may vary from a number of minutes to a number of entire days or longer. The time parameter may also include a more general window, such as morning or afternoon, morning rush hour, afternoon rush hour, and the like. The time parameter, in one embodiment, may include day characteristics, such as weekday, weekend, holiday, special event, peak day, and the like.

The test parameters 90 may also include a lingering parameter, which may be expressed in units such as a number of minutes per hour within various sectors 120, a number of total minutes in a sector 120, and the like, along with other limitations such as a range of times with a maximum and minimum and/or a lingering time expressed as a percentage of the total test duration. A lingering parameter may include a linger duration, a tower identifier, a sector identifier, and other data describing the desired duration of testing in a particular area or zone. In some applications, the duration of time spent within a particular region or sector 120 may be particularly useful to satisfy the test parameters 90.

In one embodiment, an importance factor or weight may be assigned to one or more of the test parameters 90, in order to identify those parameters of particular importance to a given test. For example, a lingering factor of a minimum number of minutes per hour within a certain sector 120 may be identified by the wireless provider 150 as one of the more important test parameters 90. Accordingly, a greater weight may be assigned to the lingering parameter for use during the comparison in Step 35.

In one embodiment, the test parameters 90 may be stored manually or in a computer, using a database or other software program to facilitate the development, storage, retrieval, and transmission of the test parameters 90. In use, the system 10 of the present invention in one embodiment may be executed using a computer software program product with multiple executable portions or routines designed or programmed to accomplish each step in the system.

5.2. Comparing the Test Parameters to a Dispatch Plan

The test parameters 90 may be transmitted to the service enterprise 30, as shown in Step 154 on FIG. 5. The service enterprise 30 may receive the test parameters 90 in Step 34.

The Step 35 of comparing the test parameters 90 to the dispatch plan 60, in one embodiment, may include the application of an algorithm specifically tailored to associate selected test parameters 90 with certain characteristics of the dispatch plan 60. The algorithm in one embodiment may be executed manually when practical, for simple test plans, for example. In another embodiment, the algorithm may be stored and executed using software on a computer system.

In general, the goal of comparing the test parameters 90 to the dispatch plan 60, in one embodiment, is to identify one or more optimal routes within the dispatch plan 60. An optimal route may be defined as a route that satisfies or nearly satisfies the test parameters 90. The degree to which the test parameters 90 are satisfied may be defined by the system according to the needs of the testing to be conducted. For example, one test may require a perfect match between all the characteristics of the routes selected and all the test parameters 90, whereas another test may require only a relatively close match. Accordingly, the term "optimal route" as used herein represents a route that meets the needs of the test, as defined by the test parameters 90 as well as the degree of satisfaction requested by the terms of the test.

The task of identifying the optimal routes, in one embodiment, may be executed by any of a variety of identifying means, such as those described herein, depending upon the complexity of the identification. For example, a manual or graphical means for identifying may be performed for relatively simple test parameters and a simple dispatch plan, whereas a digital or computer means for identifying may be needed for more complex test parameters involving larger geographic areas or time windows and dispatch plans including many routes and a large number and variety of fleet vehicles.

The execution of the algorithm in Step 35 may involve generally, in one embodiment, a comparison of geographic, equipment, and time factors.

A. Geography

In one embodiment, the test parameters 90 related to geographical considerations may include a geographic parameter, a tower identifier, and a sector identifiers. A tower identifier may include data defining a tower location, a tower capacity, and other data related to tower performance. A sector identifier may define a sector location, an antenna configuration, power specifications, and other data related to sector performance. The dispatch plan 60 may include geographical data such as the service territory 20, and the routes 61-69 to be traveled.

In one embodiment, a first step may be to select a dispatch plan 60 near the target area 70 for consideration. A dispatch plan 60 may include many routes. It should be noted that routes from different dispatch plans 60 may be considered and selected when determining how best to cover a single target area 70. Also, as shown in FIG. 6, the routes may originate from different centers or hubs 300, 361, 366, 367, 369. In another embodiment, the routes and dispatch plans 60 of a separate service enterprise may be included when considering which routes best cover the target area 70.

One or more routes in the dispatch plan 60 may be selected for analysis, in one embodiment, based upon a visual comparison between a map of the target area 70 and a map of the routes. For example, in FIG. 6, the routes lying generally within or near the target area 70 may be selected for closer technical analysis.

In one embodiment, a map of the target area 70 and a map of the set of routes 61-69 may be superimposed upon one another for comparison, as generally illustrated in FIG. 6. The maps may be superimposed digitally or by other means sufficient to allow a comparison of the features in each respective map.

The test parameters 90 for some target areas 70 may be satisfied using a map comparison technique, while other target areas 70 may include parameters 90 requiring additional analysis. The comparison in Step 35, in one embodiment, may include an analysis of the geographical characteristics of the individual stops 42 along each route 61-69. As shown in FIG. 4, a travel route may include one or more sub-routes 45 between and among one or more stops 42 in a cluster 40.

In one embodiment, the tower identifier and the sector identifiers may be compared to detailed location data describing each of the nearby routes, such as the routes 61-69 shown in FIG. 6. The comparison of these locations may be accomplished using data stored in similar coordinate systems (comparing GPS data, for example) or the comparison may require a conversion or translation of the data into like units.

B. Equipment

In one embodiment, the test parameters 90 related to equipment considerations may include the unit parameter and the quantity parameter. The dispatch plan 60 may include equipment data such as the number of service vehicles 26 in the fleet 24, and the number of those vehicles equipped with a suitable bracket 21 as shown in FIG. 7.

Figure 7:
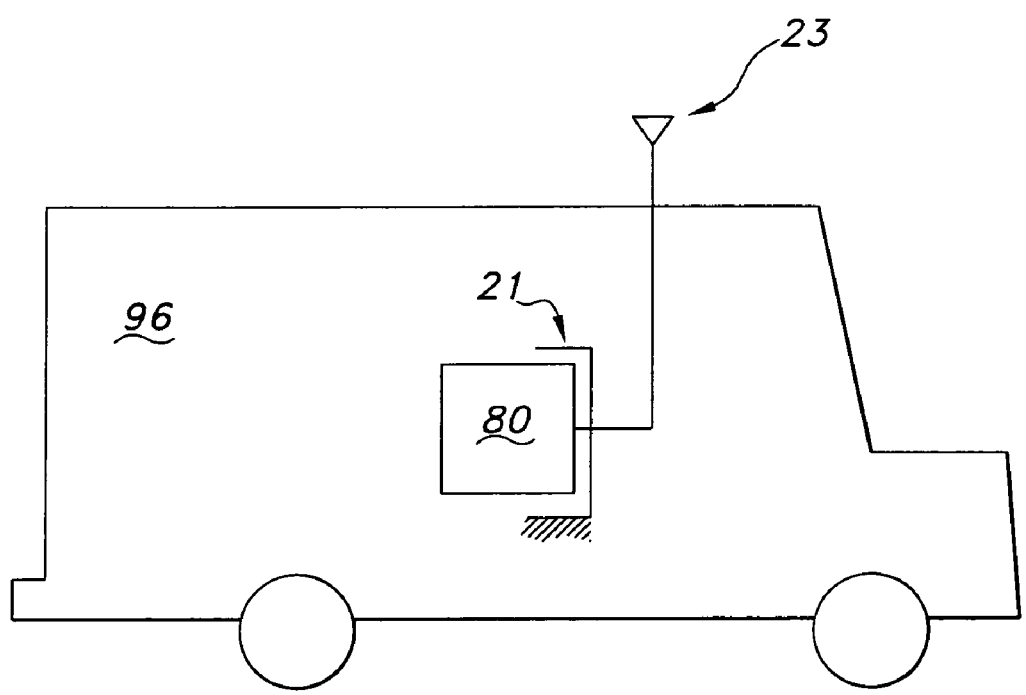
FIG. 7 is a schematic illustration of a signal testing unit mounted to a bracket in a selected vehicle, according to one embodiment of the present invention.

FIG. 7 is a schematic diagram of a signal testing unit 80 mounted to a bracket 21 on a selected service vehicle 96. The unit 80 may include an internal antenna for broadcasting data. The bracket 21 may include a connection to one or more antennae 23 connection such that, when the testing unit 80 is inserted into the bracket 21, the unit 80 may be in communication with the antennae 23. The antennae 23 may include one or two antennae for gathering wireless data and a third antenna for transmitting or receiving location data, such as a GPS signal. The bracket 21 may include a locking feature to prevent unauthorized removal or transfer.

In one embodiment, a signal testing unit 80 may be temporarily mounted on a selected service vehicle 96 in order to allow the unit 80 to be placed in any vehicle for a particular test. In this aspect, a testing unit 80 may be placed in a different vehicle each day, depending upon the target area 70 to be tested and the dispatch plan 60 to be followed.

The bracket 21, in one embodiment, may include various connections or adapter plates so that it may function as a universal docking station for various kinds of signal testing units 80. For portability, the universal bracket 21 may include connections to releasably receive any of a variety of types of testing units 80. A universal bracket 21 may facilitate the quick transfer of testing units 80 to different vehicles, without the need to match a particular unit manufacturer to the particular bracket installed in the vehicle. A universal bracket 21 may also facilitate the use of various units 80 for more than one wireless provider 150.

C. Time

In one embodiment, the test parameters 90 related to time considerations may include the time parameter and the lingering parameter. The dispatch plan 60 may include time data within the detailed description of each of the nearby routes, such as the routes 61-69 shown in FIG. 6.

The comparison of the time-related test parameters 90 to the time-related route data from the dispatch plan 60 may involve sophisticated algorithms to predict the movement, travel time, and stop time for each service vehicle in the dispatch plan 60. The analysis comparing the test parameters 90 and the nearby routes 61-69, therefore, may include a detailed analysis of the expected duration in minutes of each individual stop 42 within each sector 120 along each route in the dispatch plan 60. As shown in FIG. 4, a travel route may include one or more sub-routes 45 between and among one or more stops 42 in a cluster 40. For example, when comparing the time-related test parameters 90 described above, the data about a stop 42 may include a time window, a duration, a daily visit frequency, and other time-related data that may be particularly useful in making a comparison between each particular route and the target area 70. If the test parameters 90 include a preferred time window near a particular sector 120, for example, the expected time window for a particular stop 42 may be one of the important factors in selecting the route (and the vehicle) best suited to carry the signal testing unit 80.

D. Executing the Comparison Step

The comparison executed in Step 35 of the present invention, in one embodiment, may include one or more algorithms designed to compare geographic data, equipment data, and time data, both independently and in relation to other data. In one embodiment, the algorithm may include access to a relational database to facilitate and speed the comparison of vast amounts of inter-related data. The algorithm or algorithms may also consider the importance factor or weight assigned to one or more of the test parameters 90, in order to produce results tailored to closely match those parameters of particular importance to a given test.

The task of comparing the test parameters 90 to the dispatch plan 60, in one embodiment, may be executed by any of a variety of comparing means, such as those described herein, depending upon the complexity of the comparison. For example, a manual or graphical means for comparing may be performed for relatively simple tests, whereas a digital or computer means for comparing may be used for more complex test regimes.

The system 10 of the present invention may include one or more computers or processors, one or more computer networks, a web server, and various software applications to execute the comparison algorithm. As can be appreciated by one of ordinary skill in the art, the one or more computer networks facilitate communication between computer processors. These one or more computer networks may include any of a variety of types of computer networks such as the Internet, a private intranet, a public switch telephone network (PSTN), a Local Area Network (LAN), or any other type of network known in the art. In one embodiment, communications between computers and processors may be implemented or via the Internet using Internet protocol (IP).

In one embodiment, a main processor or server may include a processor that communicates with other elements via a system interface or bus. Also included in the server may be a display and input device for receiving and displaying data. This display and input device may be, for example, a keyboard or pointing device that is used in combination with a monitor. The server may further include memory, which preferably includes both read only memory (ROM) and random access memory (RAM). The server's ROM may be used to store a basic input/output system (BIOS), containing the basic routines that help to transfer information between elements within the server.

In addition, the server may include at least one storage device, such as a hard disk drive, a floppy disk drive, a CD-ROM drive, or optical disk drive, for storing information on various computer-readable media, such as a hard disk, a removable magnetic disk, or a CD-ROM disk. As will be appreciated by one of ordinary skill in the art, each of these storage devices may be connected to the system bus by an appropriate interface. The storage devices and their associated computer-readable media provide nonvolatile storage. It is important to note that the computer-readable media described above could be replaced by any other type of computer-readable media known in the art. Such media include, for example, magnetic cassettes, flash memory cards, digital video disks, and Bernoulli cartridges.

A number of program modules may be stored by the various storage devices and within the RAM. Such program modules may include an operating system and other software applications. Also located within the server may be a network interface for interfacing and communicating with other elements of a computer network. It will be appreciated by one of ordinary skill in the art that one or more of the server components may be located geographically remotely from other server components. Furthermore, one or more of the components may be combined, and additional components performing functions described herein may be included in the server.

In general, the comparison Step 35 produces the identification of a selected service vehicle 96 to carry each signal testing unit 80. Because each service vehicle may be assigned to a particular route, the selection of the routes 61-69 best suited to test the target area 70 may therefore lead to the identification of the selected service vehicles 96. The selection of route 64, for example, may necessarily lead to the identification of the service vehicle 96 selected to carry a unit 80 along route 64.

The task of identifying the service vehicle to carry a unit, in one embodiment, may be executed by any of a variety of identifying means, such as those described herein, depending upon the complexity of the identification. For example, a manual or graphical means for identifying may be performed for relatively small fleets, such as referring to a list of vehicle numbers and route identifiers. On the other hand, a digital or computer means for identifying may be used for more complex tests involving larger fleets of various vehicles and multiple routes.

In Step 36, the signal testing units 80 are assigned to selected service vehicles 96 and in Step 37, each unit 80 may be temporarily installed in each vehicle 96. A temporary installation may be facilitated by a bracket 21 for receiving the unit 80, as shown in FIG. 7.

6. Symbiosis in Action

In one embodiment, the signal testing units 80 temporarily installed in selected service vehicles 96 may gather data in or near the target area 70, as described in Step 38 in FIG. 5. No action by the driver is required, in one embodiment, other than to proceed along the assigned route.

A signal testing unit 80 may include any type of equipment desired by the wireless provider 150 or other participating entity. In one embodiment, the test unit 80 may include a computer, a software program, a global positioning system (GPS), and a modem capable of transmitting data 190 in a Cellular Digital Packet Data (CDPD) network.

Each signal testing unit 80 may be configured to gather data continuously or it may be set to gather data during a certain time window, in response to an external command or the detection of a signal, or otherwise programmed to operate in a desired manner. The units 80 may transmit data 190 (Step 39) during the course of the route. The data transmission may be continuous, in real-time or almost real-time, or it may occur in batches.

The data 190 may be received (Step 155) and analyzed by the wireless provider 150. The steps in FIG. 5, in one embodiment, may be repeated on a daily or other periodic basis, according to the target area 70 identified for study. The target area 70 and or its corresponding test parameters 90 may change daily or more often, or may remain constant over an extended period.

In one embodiment, the system 10 of the present invention may be scalable in multiple dimensions. In this aspect, the system 10 may accommodate target areas 70 of various sizes and test parameters 90 of various durations. For example, the system 10 may be capable of conducting "saturation testing" of a relatively small target area 70 (such as the gap 130 illustrated in FIG. 6) during a relatively short time period (a single day or a specific time window, such as the morning rush hour). On the other end of the spectrum, the system 10 may for example be configured to conduct "random testing" of a relatively large target area 70 (such as an entire wireless network serving a major metropolitan area) to gather data 190 on a continual or ongoing basis (for an entire year, for example, or until further notice). A system 10 for so-called random testing may include the assignment of routes and vehicles 96 that is truly random, but also may include assignments that are sequential, stochastic, or otherwise planned to adequately survey a large target area 70 in a statistically-representative manner (according to the test parameters 90).

7. Forming A Cooperative

In one embodiment, the system 10 of the present invention provides an opportunity for symbiosis between a service enterprise 30 and any other entity or business concern that may derive benefit from a piece of equipment, a person, or another thing being carried along one or more routes in a dispatch plan 60. In this aspect, the comparison of test parameters 90 to a dispatch plan 60 (Step 35) may include, in one embodiment, the analysis of factors other than those involved in testing electromagnetic signal strength in a wireless network.

Although the embodiment of the system 10 of the present invention described herein is most often related to delivery vehicles and a wireless provider, other types of vehicles and providers are contemplated. The types of vehicles suitable for use in the system of the present invention run the gamut, from persons on foot, to automobiles, to aircraft and spacecraft. A target area 70 may be a neighborhood, an ocean, or a region of space. For example, a fleet of aircraft may be used to carry signal testing units 80 in order to measure electromagnetic signal strength along various flight paths. In other contexts, a set of satellites may be used to carry units 80 designed to sense the radiation bombarding a planet from a particular region of space.

In this aspect, any entity for example may develop a set of parameters 90 tailored to its particular data needs within a territory. The symbiotic sharing of space on a vehicle assigned to a particular route may benefit any number of entities or businesses, including those not specifically listed herein. Parameters 90 may be developed and integrated into the system 10, for example, for everyday delivery-related tasks such as the distribution of newspapers to subscribers.

The signal testing units 80 may be configured to broadcast a message to selected citizens within a particular target area 70, for example, according to parameters 90 such as message content, message type (commercial, informative, political, public service), broadcast format (audio, video, text), duration, frequency, and other characteristics. The system 10 of the present invention may be configured in one embodiment to compare any such set of parameters 90 to the known characteristics of a dispatch plan 60, effectively and efficiently assign a unit 80 to a selected vehicle 96, and accomplish the objectives defined by the parameters 90.

8. Conclusion

The described embodiments of the invention are intended to be merely exemplary. Numerous variations and modifications will be apparent to those skilled in the art. All such variations and modifications are intended to fall within the scope of the present invention as defined in the appended list of exemplary inventive concepts.

What has been described above includes several examples. It is, of course, not possible to describe every conceivable combination of components or methodologies for purposes of describing the systems, methods, computer readable media and so on employed in planning routes. However, one of ordinary skill in the art may recognize that further combinations and permutations are possible. Accordingly, this application is intended to embrace alterations, modifications, and variations that fall within the scope of the appended list of exemplary inventive concepts. Furthermore, the preceding description is not meant to limit the scope of the invention. Rather, the scope of the invention is to be determined only by the appended list of exemplary inventive concepts and their equivalents.

While the systems, methods, and apparatuses herein have been illustrated by describing examples, and while the examples have been described in considerable detail, it is not the intention of the applicants to restrict or in any way limit the scope of the appended list of exemplary inventive concepts to such detail. Additional advantages and modifications will be readily apparent to those skilled in the art. Therefore, the invention, in its broader aspects, is not limited to the specific details, the representative systems and methods, or illustrative examples shown and described. Accordingly, departures may be made from such details without departing from the spirit or scope of the applicant's general inventive concepts.

What is claimed is:

1. A method of testing electromagnetic signal strength near a target area, comprising:

establishing test parameters including a time parameter and a geographic parameter, wherein the time parameter comprises a time-of-day testing window and one or more lingering parameters, each of said one or more lingering parameters comprising a linger duration;

operating a fleet of vehicles serving a territory near said target area, each of said vehicles being assigned to one of a plurality of routes according to a dispatch plan that is configured for purposes other than electromagnetic signal testing, said dispatch plan comprising vehicle data and route data wherein said route data includes a start time corresponding to a start location, an end time corresponding to an end location, and one or more intermediate stop durations corresponding to one or more intermediate stop locations;

comparing said test parameters to said dispatch plan for each of said plurality of routes;

identifying one or more optimal routes from among said plurality of routes based on the results of said comparing, said optimal routes comprising those most nearly satisfying said test parameters including said time parameter and said geographic parameter;

installing one of a plurality of electromagnetic signal testing units in a plurality of vehicles, one or more of the vehicles being the vehicle assigned to one each of said one or more optimal routes;

gathering electromagnetic signal data using said electromagnetic signal testing units installed in said one or more vehicles while operating said one or more vehicles according to said dispatch plan; and receiving data gathered by each of said plurality of signal testing units.

2. The method of claim 1, wherein said geographic parameter further comprises:

one or more tower identifiers, each defining a tower location, and one or more sector identifiers, each of said one or more sector identifiers comprising a sector location and an antenna configuration.

3. The method of claim 1, wherein said test parameters further comprise:

one or more unit parameters, each of said one or more unit parameters comprising a unit type and a unit feature; and a quantity parameter defining an available number of said units, and wherein said vehicle data includes a number of vehicles in said fleet.

4. The method of claim 1, wherein said step of installing further comprises providing a universal bracket in each vehicle in said fleet, said bracket being configured to releasably receive any of a variety of types of said testing units.

5. The method of claim 1, wherein said step of establishing test parameters further comprises:

assigning a weight to one or more of said test parameters, each of said weights correlated to the importance of said one or more of said test parameters relative to the other test parameters.

6. The method of claim 1, wherein said step of comparing said test parameters to said dispatch plan is executed by a computer software program product.

7. The method of claim 1, wherein said step of establishing said test parameters is accomplished by a wireless provider, said wireless provider being generally unrelated to said fleet of vehicles' dispatch plan.

8. A computer software program product comprising at least one non-transitory computer-readable storage medium having computer-readable program code portions stored therein for testing electromagnetic signal strength near a target area, the computer-readable program code portions comprising:

a first executable portion configured to store test parameters including a time parameter and a geographic parameter, wherein the time parameter comprises a time-of-day testing window and one or more lingering parameters, each of said one or more lingering parameters comprising a linger duration;

a second executable portion configured to store a dispatch plan for a fleet of vehicles serving a territory near said target area, each of said vehicles being assigned to one of a plurality of routes according to a dispatch plan that is configured for purposes other than electromagnetic signal testing, said dispatch plan comprising vehicle data and route data wherein said route data includes a start time corresponding to a start location, an end time corresponding to an end location, and one or more intermediate stop durations corresponding to one or more intermediate stop locations;

a third executable portion configured to compare said test parameters to said dispatch plan for each of said plurality of routes;

a fourth executable portion configured to identify one or more optimal routes from among said plurality of routes based on the results of said third executable portion, said optimal routes comprising those most nearly satisfying said test parameters including said time parameter and said geographic parameter;

a fifth executable portion configured to identify respective vehicles assigned to each of said one or more optimal routes, said respective vehicles to receive one of a plurality of electromagnetic signal testing units; and a sixth executable portion configured to receive data gathered by each of said plurality of signal testing units.

9. The computer software program product of claim 8, wherein said geographic parameter comprises:
one or more tower identifiers, each defining a tower location, and one or more sector identifiers, each of said one or more sector identifiers comprising a sector location and an antenna configuration.

10. The computer software program product of claim 8, wherein said first executable portion is further configured to store test parameters including:
one or more unit parameters, each of said one or more unit parameters comprising a unit type and a unit feature, and
a quantity parameter defining an available number of said units,
and wherein said second executable portion is further configured to store vehicle data including a number of vehicles in said fleet.

11. The computer software program product of claim 8, wherein said first executable portion is further configured to store a weight assigned to one or more of said test parameters, each of said weights correlated to the importance of said one or more of said test parameters relative to the others.

12. A system for testing electromagnetic signal strength near a target area, wherein a wireless provider establishing test parameters, said system comprising:
a plurality of electromagnetic signal testing units;
a service enterprise having a fleet of vehicles serving a territory near said target area, each of said vehicles in said fleet assigned to one of a plurality of routes according to a dispatch plan configured for purposes other than electromagnetic signal testing, said dispatch plan comprising vehicle data and route data wherein said route data includes a start time corresponding to a start location, an end time corresponding to an end location, and one or more intermediate stop durations corresponding to one or more intermediate stop locations;
means for comparing said test parameters to said dispatch plan for each of said plurality of routes;
means for identifying one or more optimal routes from among said plurality of routes based on results from said comparing means, said optimal routes comprising those most nearly satisfying said test parameters including a time parameter and a geographic parameter, wherein said time parameter comprises a time-of-day testing window and one or more lingering parameters, each of said one or more lingering parameters comprising a linger duration, and wherein one of said plurality of testing units is installed in a respective one of said fleet vehicles, said respective vehicle being assigned to one of said one or more optimal routes; and a receiver for receiving data gathered by each of said plurality of signal testing units.

13. The system of claim 12, wherein said geographic parameter further comprises:
one or more tower identifiers, each defining a tower location; and
one or more sector identifiers, each of said one or more sector identifiers comprising a sector location and an antenna configuration.

14. The system of claim 12, wherein said test parameters further comprise:
one or more unit parameters, each of said one or more unit parameters comprising a unit type and a unit feature; and
a quantity parameter defining an available number of said units,
and wherein said vehicle data includes a number of vehicles in said fleet.

15. The system of claim 12, further comprising:
a universal bracket in each vehicle in said fleet, said bracket being configured to releasably receive any of a variety of types of said testing units.

16. The system of claim 12, wherein said test parameters further comprise:
a weight assigned to one or more of said test parameters, each of said weights being correlated to the importance of said one or more of said test parameters relative to the others.

17. The system of claim 12, wherein said comparing means comprises a computer software program product.

18. The system of claim 12, wherein said identifying means comprises a computer software program product.

19. The system of claim 12, wherein said wireless provider is generally unrelated to said service enterprise.

20. A system for testing electromagnetic signal strength a near a target area wherein a wireless provider establishes a set of test parameters for the test, said system comprising:
a plurality of electromagnetic signal testing units;
a service enterprise having a fleet of vehicles serving a territory near said target area, each of said vehicles in said fleet assigned to one of a plurality of routes according to a dispatch plan configured for purposes other than electromagnetic signal testing, said dispatch plan comprising vehicle data and routed data, wherein said route data includes a start time corresponding to a start location, an end time corresponding to an end location, and one or more intermediate stop durations corresponding to one or more intermediate stop locations;
a computing device programmed to perform the steps of:
comparing said test parameters to said dispatch plan for each of said plurality of routes;
identifying one or more optimal routes from among said plurality of routes based on results from said comparing, said optimal routes comprising those most nearly satisfying said test parameters including said time parameter and said geographic parameter, wherein the time parameter comprises a time-of-day testing window and one or more lingering parameters, each of said one or more lingering parameters comprising a linger duration, and wherein one of said plurality of testing units is installed in a respective one of said fleet vehicles assigned to one of said one or more optimal routes; and
a receiver for receiving data gathered by each of said plurality of signal testing units.

* * * * *